United States Patent
Xue et al.

(10) Patent No.: US 10,968,343 B2
(45) Date of Patent: Apr. 6, 2021

(54) FORMALDEHYDE-FREE CURABLE FORMULATION

(71) Applicants: Rohm and Haas Company, Philadelphia, PA (US); Yin Xue, Shanghai (CN); Zhenbing Chen, Shanghai (CN)

(72) Inventors: Yin Xue, Shanghai (CN); Zhenbing Chen, Shanghai (CN)

(73) Assignee: Rohm And Haas Company, Collegeville, PA (US)

( * ) Notice: Subject to any disclaimer, the term of this patent is extended or adjusted under 35 U.S.C. 154(b) by 330 days.

(21) Appl. No.: 16/063,813

(22) PCT Filed: Dec. 29, 2015

(86) PCT No.: PCT/CN2015/099429
§ 371 (c)(1),
(2) Date: Jun. 19, 2018

(87) PCT Pub. No.: WO2017/113095
PCT Pub. Date: Jul. 6, 2017

(65) Prior Publication Data
US 2020/0270443 A1 Aug. 27, 2020

(51) Int. Cl.
*C08L 39/04* (2006.01)
*C09J 7/38* (2018.01)
*C08F 220/18* (2006.01)
*C08F 2/22* (2006.01)
*C08F 212/08* (2006.01)
*C08F 220/06* (2006.01)
*C08F 222/02* (2006.01)

(52) U.S. Cl.
CPC ........... *C08L 39/04* (2013.01); *C08F 2/22* (2013.01); *C08F 212/08* (2013.01); *C08F 220/06* (2013.01); *C08F 220/1804* (2020.02); *C08F 222/02* (2013.01); *C09J 7/385* (2018.01); *C08L 2201/52* (2013.01); *C08L 2201/54* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 4,325,856 A | | 4/1982 | Ishikawa et al. |
| 4,508,869 A | * | 4/1985 | Keskey .................. C08F 226/06 |
| | | | 524/808 |
| 4,592,930 A | * | 6/1986 | Schmidt .................... C08F 8/18 |
| | | | 427/133 |
| 4,654,397 A | | 3/1987 | Mueller-Mall et al. |
| 4,814,373 A | | 3/1989 | Frankel et al. |
| 6,084,023 A | * | 7/2000 | Rasoul .................. C08F 257/02 |
| | | | 524/530 |
| 2012/0003470 A1 | | 1/2012 | Kamiya et al. |
| 2012/0219795 A1 | * | 8/2012 | Mitsui ..................... C08L 33/08 |
| | | | 428/355 AC |

FOREIGN PATENT DOCUMENTS

| | | |
|---|---|---|
| CN | 101392166 A | 3/2009 |
| CN | 102051146 A | 5/2011 |
| CN | 103805106 A | 5/2014 |
| EP | 2431436 A1 | 3/2012 |
| JP | H06248030 A | 9/1994 |
| JP | H10251474 A | 9/1998 |
| JP | 3029707 B2 | 4/2000 |
| JP | 3029708 B2 | 4/2000 |
| JP | 2000303026 A | 10/2000 |
| JP | 3259147 B2 | 2/2002 |
| JP | 2004089933 A | 3/2004 |
| JP | 2007070448 A | 3/2007 |
| JP | 2009073920 A | 4/2009 |
| RU | 2092504 C1 | 10/1997 |
| RU | 2165488 C2 | 4/2001 |
| RU | 2177010 C2 | 12/2001 |
| RU | 2258727 C2 | 8/2005 |
| RU | 2554088 C2 | 6/2015 |
| SU | 1788956 | 1/1993 |
| WO | 2008081755 A1 | 7/2008 |
| WO | 2012076566 A2 | 6/2012 |

OTHER PUBLICATIONS

English Machine Translation CN101392166, prepared Jul. 19, 2020. (Year: 2020).*
PCT/CN2015/099429, International Search Report and Written Opinion dated Sep. 6, 2016.

* cited by examiner

*Primary Examiner* — Christopher M Rodd

(57) ABSTRACT

A curable aqueous formulation comprising a) an emulsion polymer with 0.1 to 20 weight percent acid monomers, b) an oxazoline-containing polymer, and c) an aqueous acrylic polymer dispersion with 40 to 100 weight percent acid monomers and having a weight average molecular weight in the range of from 2000 to 500000.

10 Claims, No Drawings

FORMALDEHYDE-FREE CURABLE FORMULATION

FIELD OF INVENTION

The instant invention relates to binders for textiles and nonwoven applications.

BACKGROUND OF THE INVENTION

Traditional binders used in textile and nonwoven application contain N-Methylolacrylamide (NMA) as a functional monomer which gives the binders excellent water resistance (wet strength) and solvent resistance (isopropyl alcohol strength) after curing. However, NMA-containing binders release formaldehyde upon heating. One solution used in the past was a formaldehyde-free crosslinking technology based on itaconic acid. This technology has good water and solvent resistance after cure, but lacks the excellent properties of a NMA-containing binder. Therefore, a system which is formaldehyde-free and which also has comparable properties is desirable.

SUMMARY OF THE INVENTION

One aspect of the present invention is a curable aqueous formulation comprising, consisting of, or consisting essentially of a) an emulsion polymer with 0.1 to 20 weight percent acid monomers b) an oxazoline-containing polymer; and c) an aqueous acrylic polymer dispersion with 40 to 100 weight percent acid monomers and having a weight average molecular weight in the range of from 2000 to 500000.

DETAILED DESCRIPTION OF THE INVENTION

The instant invention provides a method for forming an aqueous curable formulation.

"Aqueous", as used herein, means a composition in which the continuous phase is water or, in the alternative, a mixture including predominantly water but also optionally including water-miscible solvents, biocides, emollients, buffers, chelants, and surfactants and other ingredients.

By "woven" herein is meant a fabric-like assembly of fibers typically in sheet or web form which is formed by interlacing long threads passing in one direction with others at a right angle to them.

By "nonwoven" herein is meant a fabric-like assembly of fibers typically in sheet or web form that is not a woven or knitted material. The nonwoven substrate includes paper; nonwoven fabrics; felts and mats; or other assemblies of fibers. A nonwoven substrate may include: cellulosic fibers such as cotton, rayon, and wood pulp; synthetic fibers such as polyester, glass, and nylon; bicomponent fibers; and mixtures thereof. It can be formed by methods known in the art such as, for example, wet-laid, air-laid, spunbonding, spunmelt, and hydroentangling web formation.

The curable aqueous formulation comprises, consists of, or consists essentially of a) an emulsion polymer with 0.1 to 20 weight percent acid monomers, b) an oxazoline-containing polymer; and c) an aqueous acrylic polymer dispersion with 40 to 100 weight percent acid monomers and having a weight average molecular weight in the range of from 2000 to 500000.

Component A—Emulsion Polymer

The aqueous nonwoven binder includes an emulsion polymer; that is, a polymer prepared by the free radical polymerization of ethylenically-unsaturated monomers in an aqueous emulsion polymerization process. The emulsion polymer includes, as copolymerized units, from 0.1 to 20 weight percent acid monomers, based on the weight of the emulsion polymer. All ranges between 0.1 and 20 weight percent are included herein and disclosed herein; for example, the weight percent of acid monomers can be from a lower limit of 0.1, 5, 7, or 10 to an upper limit of 12, 15, 18, or 20.

The emulsion polymer also has a weight average molecular weight of from 5000 to 500000. Any and all ranges between 5000 to 500000 are included herein and disclosed herein, for example, the emulsion polymer can have a weight average molecular weight of 50000 to 400000 or from 100000 to 300000.

Acid monomers can include monoacid monomers and diacid monomers. Monoacid monomers include, for example, carboxylic acid monomers such as, for example, acrylic acid, methacrylic acid, crotonic acid, monomethyl itaconate, monomethyl fumarate, monobutyl fumarate. Examples of diacid monomers include, but are not limited to itaconic acid, fumaric acid, maleic acid; including their anhydrides, salts, and mixtures thereof.

The emulsion polymer also includes at least one other copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride; and (meth)acrylonitrile. The use of the term "(meth)" followed by another term such as (meth)acrylate or (meth)acrylamide as used throughout the disclosure, refers to both acrylates and methacrylates or acrylamides and methacrylamides, respectively. Mixtures of emulsion polymers having different compositions can also be used.

The emulsion polymer is present in the formulation in the range of from 80 to 99.8 weight percent, based on dry solids. The emulsion polymer can be present in the range of from 82 to 99.8 weight percent in various other embodiments, and from 85 to 99.8 weight percent in various other embodiments.

Component B—Oxazoline-Containing Polymer

The formulation also includes at least one oxazoline-containing polymer as a crosslinker. In various embodiments, the oxazoline-containing polymer can be produced by carrying out a solution polymerization reaction or an emulsion polymerization of an addition-polymerizable oxazoline and at least one ethylenically unsaturated monomer (such as those listed above). in an aqueous medium using any suitable polymerization process known to those skilled in the art. In various embodiments, an addition polymerization reaction takes place.

In various embodiments, the oxazoline-containing polymer has a structure of the formula shown below:

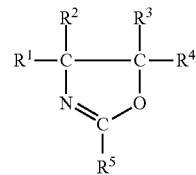

wherein R1, R2, R3, and R4 independently represent a hydrogen atom, a halogen atom, an alkyl group, an aralkyl group, a phenyl group, a substituted phenyl group, and R5 represents a non-cyclic organic group having an addition-polymerizable unsaturated bond.

In some embodiments, the oxazoline-containing polymer has 2-oxazoline groups.

Examples of oxazoline-containing polymers include, but are not limited to vinyl oxazolines such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, 2-isopropenyl-4-hydroxymethyl-4-ethyl-2-oxazoline, 2-(I-hexadecylvinyl)-4,4-bis stearoyloxymethyl)-2-oxazoline, 2-(I-eicosylvinyl)-4,4-bis(hydroxymethyl)-2-oxazoline, 2-isopropenyl-4,4-bis(hydroxymethyl)-2-oxazoline, 2-isopropenyl-4,4-bis(methyl)-2-oxazoline.

The oxazoline-containing polymer is generally present in the formulation in the range of from 0.1 to 10 weight percent, based on dry solids. The oxazoline-containing polymer can be present in the range of from 1 to 8 weight percent in various other embodiments, and from 3 to 7 weight percent in various other embodiments.

Component C—Aqueous Acrylic Polymer Dispersion

The formulation also includes an aqueous acrylic polymer dispersion. The aqueous acrylic polymer dispersion has from 40 to 100 weight percent acid groups. The dispersion can have from 50 to 95 weight percent acid groups in various other embodiments, and from 65 to 80 weight percent acid groups in various other embodiments. The aqueous acrylic polymer dispersion also has a weight average molecular weight in the range of from 2000 to 500000. The dispersion can have a weight average molecular weight of from 50000 to 400000 in various other embodiments, and from 100000 to 350000 in various other embodiments.

The aqueous acrylic polymer dispersion can also be formed from any of the ethylenically unsaturated monomers listed above.

The aqueous acrylic polymer dispersion is generally present in the formulation in the range of from 0.1 to 10 weight percent, based on dry solids. The dispersion can be present in the range of from 1 to 8 weight percent in various other embodiments, and from 3 to 7 weight percent in various other embodiments.

Optional Components

The aqueous nonwoven binder may also include conventional treatment components such as, for example, emulsifiers, pigments, fillers or extenders, anti-migration aids, coalescents, surfactants, biocides, plasticizers, organosilanes, anti-foaming agents, corrosion inhibitors, colorants, waxes, other polymers, and anti-oxidants.

The emulsion polymerization techniques used to prepare the emulsion polymer are well known in the art such as, for example, as disclosed in U.S. Pat. Nos. 4,325,856; 4,654,397; and 4,814,373. In various embodiments, the emulsion polymerization is performed at a reaction temperature of from room temperature to 100° C., depending on the initiation process (eg., thermal or redox). Conventional surfactants may be used such as, for example, anionic and/or nonionic emulsifiers such as, for example, alkali metal or ammonium alkyl sulfates, alkyl sulfonic acids, fatty acids, copolymerizable surfactants, and oxyethylated alkyl phenols. Preferred are anionic emulsifiers. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, and water-soluble azo compounds such as azobis cyanovaleric acid, typically at a level of 0.01% to 3.0% by weight, based on the weight of total monomer. In an embodiment, the initiator is present in a range of from 0.5% to 1.5% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. In various embodiments, the emulsion polymer may be prepared by a multistage emulsion polymerization process, in which at least two stages differing in composition are polymerized in sequential fashion. The molecular weight of the final polymer falls within the above molecular weight ranges. The oxazoline-containing polymer and aqueous acrylic polymer dispersion can then be added to the emulsion polymer, with stirring or agitation in some embodiments.

The average particle diameter of the emulsion polymer particles is typically from 30 nanometers to 1000 nanometers, preferably from 100 nanometers to 200 nanometers as measured by a Brookhaven Model BI-90 Particle Sizer supplied by Brookhaven Instrument Corp., Holtsville, N.Y.

A woven or nonwoven substrate is contacted with the curable aqueous formulation. Typically the ratio of formulation to that of the contacted substrate on a dry weight basis expressed as a percentage, also known as % add-on, is from 1% to 40%, preferably from 15% to 35%, selected depending on the strength of the substrate and the desired end use. The substrate is contacted with the curable aqueous formulation using conventional application techniques such as, for example, air or airless spraying, padding, saturating, roll coating, curtain coating, gravure printing, and the like. The substrate may be contacted with the curable aqueous formulation so as to provide binder at or near one or both surfaces or distributed uniformly, or not, throughout the structure. It is also contemplated that the curable aqueous formulation may be applied in a nonuniform manner to one or both surfaces when a patterned distribution is desired.

In the method for forming a substrate containing the curable aqueous formulation of the present invention, the substrate that has been contacted with the curable aqueous formulation is heated to a temperature of from 120° C. to 220° C., preferably from 140° C. to 180° C., for a time sufficient to achieve curing.

In addition to textile and non-woven applications, the curable aqueous formulation of the present invention can also be used to make pressure-sensitive adhesives and laminating adhesives.

EXAMPLES

Abbreviations Used:
IPA: Isopropanol
DI water: Deionized water
CD: Cross-machine direction
SC: Solids content
BA: Butyl acrylate
Sty: Styrene
IA: Itaconic acid
AA: Acrylic acid
DS-4: sodium dodecyl benzene sulfonate, a surfactant
TR-407: Current commercial product based on NMA technology with formaldehyde (HCHO)
SWX1116(A): Emulsion with 49Sty/46BA/3AA/2IA in polymer with SC of 45%
EPOCROS WS500 (B): Solution polymer with oxazoline groups from Nippon Shokubai with SC of 40% and an oxazoline content of 4.5 mmol/g solid
Leukotan 1084 (C1): Water solution polymer from The Dow Chemical Company with 100% AA and SC of 28%
ASE60 (C2): Emulsion polymer from The Dow Chemical Company with 40% AA and SC of 28%
TRITON™ X-100: Surfactant from The Dow Chemical Company
WHATMAN™ #4 paper from Whatman Ltd.

Inventive Examples 1 and 2 and Comparative Examples 1 and 2

The above raw materials were formulated with proper agitation for 30 minutes to obtain curable aqueous compositions according to the formulations in Tables 1 and 2.

TABLE 1

Formulation of Samples.

| | Water | TR407 | SWX1116 (A) | EPOCROS WS500 (B) | Citric Acid | Leukotan1084 (C1) | ASE60 (C2) |
|---|---|---|---|---|---|---|---|
| Comparison 1 | 80 | 100 | | | | | |
| Comparison 2a | 80 | | 100 | | | | |
| Comparison 3 | 82 | | 100 | 3.5 | | | |
| Comparison 4 | 82.2 | | 100 | 3.5 | 0.0585 | | |
| Comparison 5 | 80.3 | | 100 | | | 2.5 | |
| Comparison 6 | 80.6 | | 100 | | | | 5 |
| Inventive 1 | 82.4 | | 100 (95.5%)* | 3.5 (3%) | | 2.5 (1.5%) | |
| Inventive 2 | 82.7 | | 100 (94%) | 3.5 (3%) | | | 5 (3%) |

*Value in the bracket ( ) is the solid ratio in the formulation

TABLE 2

Formulation of Samples.

| | Water | SWX1116 (A) | EPOCROS WS500 (B) | Leukotan1084 (C1) |
|---|---|---|---|---|
| Comparison 2b | 200 | 100 | | |
| Inventive 3 | 192.75 | 80 (80%)* | 11.25 (10%) | 16 (10%) |
| Inventive 4 | 199.93 | 99.8 (99.8%)* | 0.11 (0.1%) | 0.16 (0.1%) |
| Inventive 5 | 198.69 | 89.9 (89.9%) | 11.25 (10%) | 0.16 (0.1%) |
| Inventive 6 | 193.99 | 89.9 (89.9%) | 0.11 (0.1%) | 16 (10%) |

*Value in the bracket ( ) is the solid ratio in the formulation

A piece of WHATMAN™ paper 28 cm×46 cm was dipped into 200 mL of the formulated emulsion. The treated substrate was padded by a Mathis padder and then dried and cured at 150° C. for 3 minutes. The amount of the polymer on paper was controlled between 28%~32% for Table 1, and 15%~16% for Table 2. The cured substrate was cut into pieces of 1 inch×4 inch wherein the 4 inch direction was the cross-machine direction (CD) of the paper. The tensile strength of the specimens was tested under the treatment of dry (untreated), wet (after 30 minutes immersion in 0.1% Triton X-100/water solution), and IPA (after 30 minutes in isopropanol). The wet strength reflects the resistance of the binder to water and the IPA strength reflects the resistance of the binder in solvent. The data is shown in Tables 3 and 4.

TABLE 3

Application Test of Samples.

| | HCHO-containing | Description | Dry strength | Wet strength | IPA strength |
|---|---|---|---|---|---|
| Comparison 1 | Y | | 16.23 | 9.15 | 6.72 |
| Comparison 2a | N | A | 16.12 | 6.72 | 3.48 |
| Comparison 3 | N | A + B | 16.12 | 7.42 | 6.9 |
| Comparison 4 | N | A + B + acid | 16.02 | 7.39 | 6.63 |
| Comparison 5 | N | A + C1 | 16.9 | 6.83 | 4.49 |
| Comparison 6 | N | A + C2 | 16.47 | 6.9 | 3.05 |
| Inventive 1 | N | A + B + C1 | 16.56 | 8.59 | 6.94 |
| Inventive 2 | N | A + B + C2 | 16.18 | 8.13 | 6.2 |

The results in Table 3 show:

The higher strength value results in a better performance.

Except for Comparison 1, all the examples are HCHO-free.

Comparison 1 is based on NMA technology with HCHO containing, and showed the best overall performances.

Comparison 3 showed better IPA strength than Comparison 2a.

Comparison 4 had low molecular acid and did not improve performances from Comparison 3.

Comparison 5, 6 had high acid polymer (C) and did not improve overall performances from comparison 2a without the oxazoline containing polymer.

TABLE 4

Application Test of Samples.

|  | Dry strength | Wet strength | IPA strength |
|---|---|---|---|
| Comparison 2b | 9.37 | 3.51 | 2.25 |
| Inventive 3 | 9.34 | 3.02 | 4.74 |
| Inventive 4 | 9.60 | 3.98 | 2.80 |
| Inventive 5 | 9.84 | 4.13 | 4.56 |
| Inventive 6 | 9.83 | 3.26 | 3.81 |

Summary:

Compared to Comparison 2b, Inventive Examples 4 and 5 showed greater than 10% improvement on wet strength, and at least 20% improvement on IPA strength.

Compared to Comparison 2b, Inventive Examples 3 and 6 showed less than 15% lower wet strength, but more than 65% increase on IPA strength.

Comparing Inventive Examples 4 and 6, it is found that, if component C is increased from 0.1% to 10%, the IPA strength will increase from 2.8 to 3.81.

The invention claimed is:

1. A curable aqueous formulation comprising
 a) an emulsion polymer with 5 to 20 weight percent acid monomers;
 b) an oxazoline-containing polymer; and
 c) an aqueous acrylic polymer dispersion with 40 to 100 weight percent acid monomers and having a weight average molecular weight in the range of from 2000 to 500000.

2. The curable aqueous formulation of claim 1 wherein the emulsion polymer is present in an amount in the range of from 80 to 99.8 weight percent, the oxazoline-containing polymer is present in an amount in the range of from 0.1 to 10 weight percent, and the aqueous acrylic polymer dispersion is present in an amount in the range of from 0.1 to 10 weight percent, based on dry solids.

3. The curable aqueous formulation of claim 1 wherein the emulsion polymer comprises styrene, butyl acrylate, acrylic acid, and itaconic acid.

4. The curable aqueous formulation of claim 1 wherein the oxazoline-containing polymer has at least one 2-oxazoline group.

5. The curable aqueous formulation of claim 1 wherein the oxazoline-containing polymer is selected from the group consisting of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, 2-isopropenyl-4-hydroxymethyl-4-ethyl-2-oxazoline, 2-(I-hexadecylvinyl)-4,4-bis stearoyloxymethyl)-2-oxazoline, 2-(I-eicosylvinyl)-4,4-bis(hydroxymethyl)-2-oxazoline, 2-isopropenyl-4,4-bis(hydroxymethyl)-2-oxazoline, 2-isopropenyl-4,4-bis(methyl)-2-oxazoline, and mixtures thereof.

6. A method for forming the curable aqueous formulation of claim 1 comprising the steps of:
 a) emulsion polymerizing at least one mono-ethylenically unsaturated monomer and at least one acid monomer in an aqueous solution to form the emulsion polymer; and
 b) adding the oxazoline-containing polymer and the aqueous acrylic polymer dispersion to the emulsion polymer to form the curable aqueous formulation.

7. A method for forming a cured substrate with the curable aqueous formulation of claim 1 comprising
 a) contacting a woven or nonwoven substrate with the curable aqueous formulation to form a contacted substrate; and
 b) heating the contacted substrate to a temperature of from 120° C. to 220° C. to form the cured substrate.

8. A product comprising:
 a) a woven or nonwoven substrate; and
 b) a binder comprising the curable aqueous formulation of claim 1.

9. A pressure-sensitive adhesive comprising the curable aqueous formulation of claim 1.

10. A laminating adhesive comprising the curable aqueous formulation of claim 1.

* * * * *